March 9, 1954  R. P. STEADMAN  2,671,416
AUTOMATIC COILING AND PANNING MECHANISM
Filed Aug. 16, 1950  4 Sheets-Sheet 1
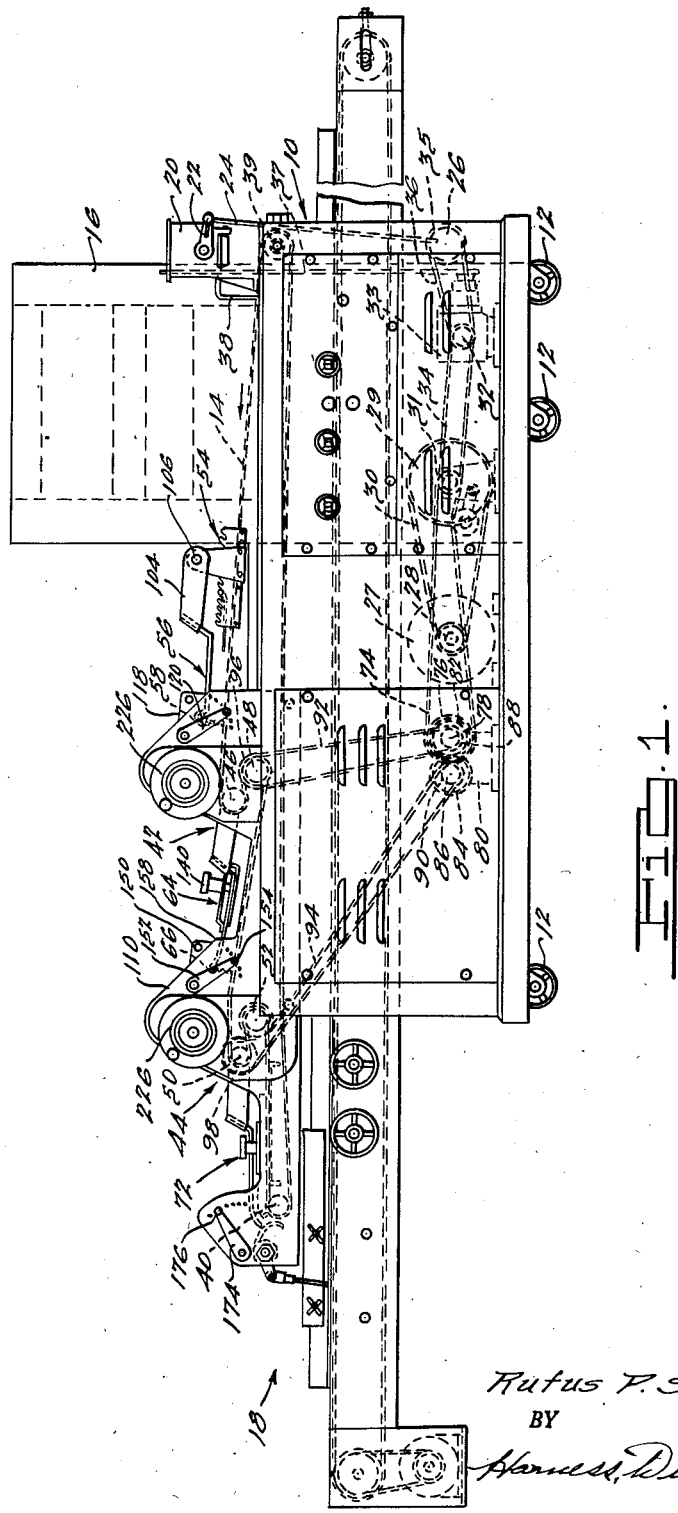
INVENTOR.
Rufus P. Steadman.
BY
Harness, Dickey & Pierce
ATTORNEYS.

March 9, 1954 R. P. STEADMAN 2,671,416
AUTOMATIC COILING AND PANNING MECHANISM
Filed Aug. 16, 1950 4 Sheets-Sheet 2
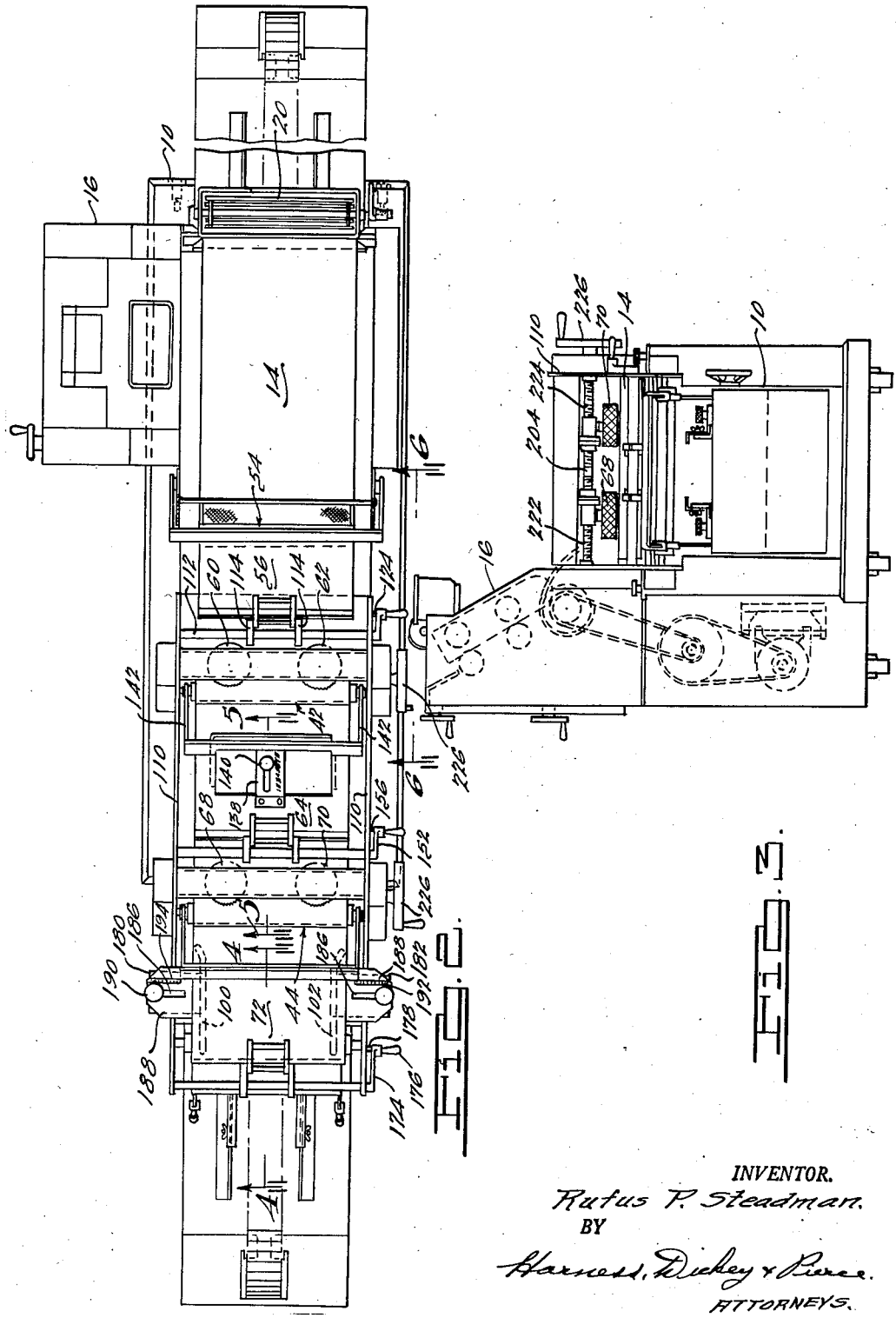
INVENTOR.
Rufus P. Steadman.
BY
Harness, Dickey & Pierce.
ATTORNEYS.

March 9, 1954    R. P. STEADMAN    2,671,416
AUTOMATIC COILING AND PANNING MECHANISM
Filed Aug. 16, 1950    4 Sheets-Sheet 3

INVENTOR.
Rufus P. Steadman.
BY
Haines, Dickey & Pierce
ATTORNEYS.

March 9, 1954 R. P. STEADMAN 2,671,416
AUTOMATIC COILING AND PANNING MECHANISM
Filed Aug. 16, 1950 4 Sheets-Sheet 4
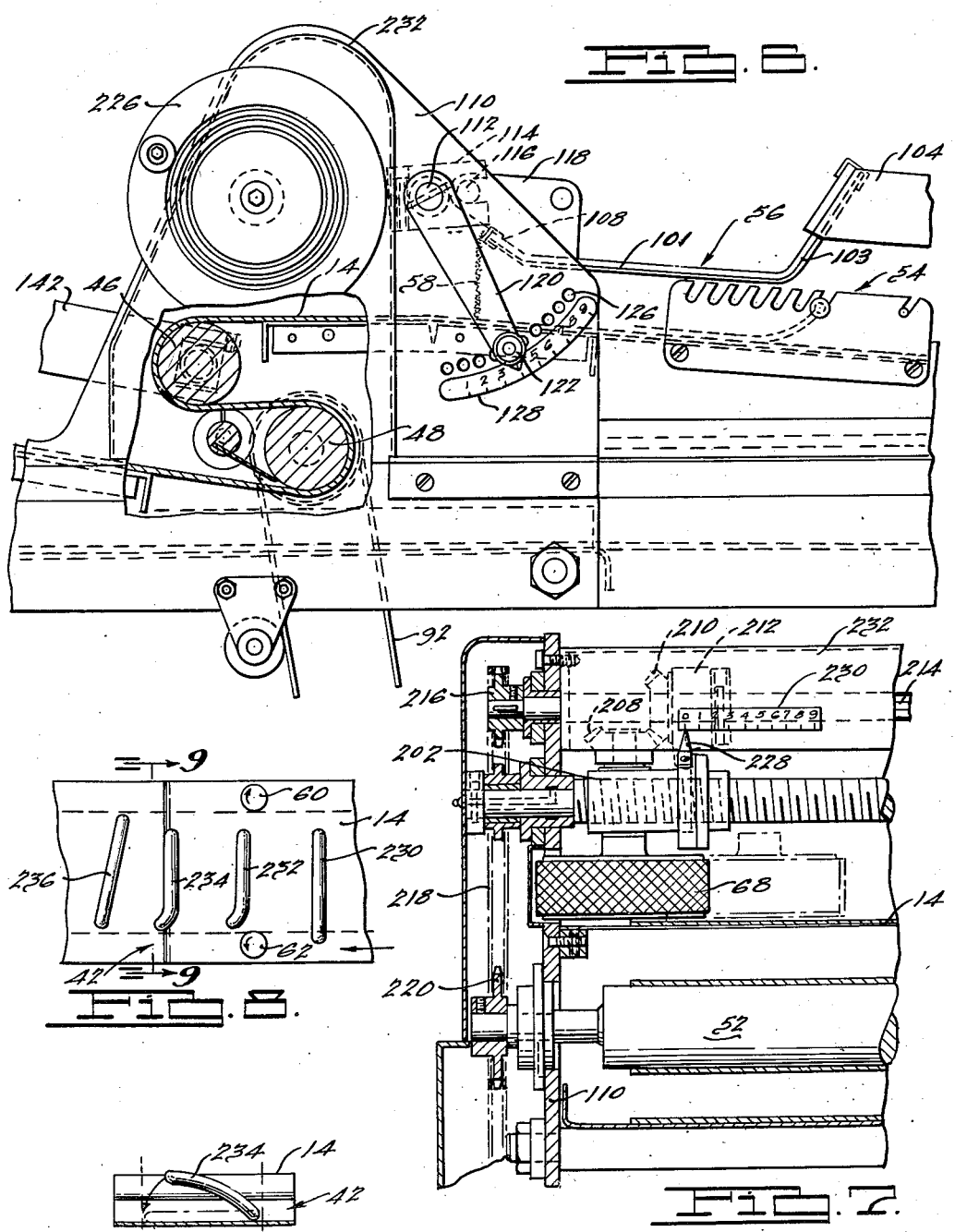
INVENTOR.
Rufus P. Steadman.
BY
Harness, Dickey & Pierce
ATTORNEYS.

Patented Mar. 9, 1954

2,671,416

UNITED STATES PATENT OFFICE 2,671,416

AUTOMATIC COILING AND PANNING MECHANISM

Rufus P. Steadman, Saginaw, Mich., assignor to Baker Perkins Inc., Saginaw, Mich., a corporation of New York Application August 16, 1950, Serial No. 179,748

20 Claims. (Cl. 107—4)

This invention relates to new and useful improvements in dough-handling machines.

Commercial bakery equipment of the type used for making bread and the like includes apparatus for preparing and forming dough pieces of proper size. The individual dough pieces are delivered automatically to a conveyor which transports them to an automatic panning device where they are placed in individual pans or containers for baking. In many installations these operations are fully automatic and the apparatus must be constructed to handle all situations that arise during operation thereof.

The instant invention is primarily concerned with the conveyor which transports the dough pieces from the molder to the automatic panning device. In this connection, however, it will be readily apparent that while the invention is preeminently suited for the purpose set forth above, it is not limited thereto but can be used in any capacity where apparatus of this type has utility.

In order for the dough pieces to be deposited automatically in the baking pans they must be delivered uniformly to the pans, and this means that all of the dough pieces must be identically positioned on the conveyor. Very little trouble is encountered in this respect if the dough pieces are delivered longitudinally onto the conveyor. However, relatively recently it has been discovered that the grain structure of the loaves can be improved by cross-grain molding which requires that the dough pieces be delivered to the conveyor from the side. The dough pieces move out of the molder on an endless belt usually referred to as a "flipper" and then drop from the belt onto the conveyor. By reason of the fact that the dough pieces fall onto the conveyor from the side, however, it is difficult to place them uniformly exactly centrally on the conveyor. Some of the dough pieces of course fall properly on the middle or center of the conveyor, but other pieces fall short or are thrown too far across the conveyor so that they are not aligned properly for delivery to the automatic panning device.

The dough pieces carried by the conveyor are merely lumps of soft dough covered with flour and they are exceedingly difficult to handle without breaking the outer layer or "skin." Once the skin is broken, the soft, sticky interior of the piece is exposed and it tends to stick to and smear the conveyor or any other piece of equipment that it touches. In short, these dough pieces are messy to handle when broken, and if too many of the dough pieces are broken or ruptured they tend to foul and prevent proper operation of the equipment. Moreover, the dough pieces cannot be centered on the conveyor in the usual manner by converging rails at the sides of the conveyor, as this tends to break down and otherwise damage the cell structure of the dough. Accordingly, it will be readily apparent that the problem of centering dough pieces on the conveyor is a very real one indeed.

An important object of the present invention is to provide means for centering dough pieces on conveyor apparatus of the type referred to above.

Another object of the invention is to provide means operative in conjunction with the centering mechanism to position all the dough pieces transversely on the conveyor for proper delivery to the automatic panning device.

Still another object of the invention is to provide means for rolling and extending the dough pieces as they are moved along by the conveyor with a minimum of damage to the cell structure of the dough and so that the ends of the dough pieces can be squared by conventional guide rails without the usual damage to the cell structure at the ends of the loaves.

Other objects and advantages of the invention will be apparent during the course of the following description.

In the drawings forming a part of this specification and wherein like numerals are employed to designate like parts throughout the same:

Figure 1 is a side elevational view of a conveyor apparatus uniquely constructed according to the present invention to center dough pieces properly on the conveyor for delivery to a conventional automatic panning device;

Fig. 2 is a plan view of the same;

Fig. 3 is an end view from the discharge end of the conveyor;

Fig. 6 is an enlarged, fragmentary, vertical sectional view taken on the line 6—6 of Fig. 2;

Fig. 7 is a fragmentary, transverse, vertical sectional view taken on the line 7—7 of Fig. 5;

Fig. 8 is a fragmentary plan view illustrating the manner in which the dough pieces are centered on the conveyor; and Fig. 9 is a transverse, vertical sectional view taken on the line 9—9 of Fig. 8.

Figure 4:
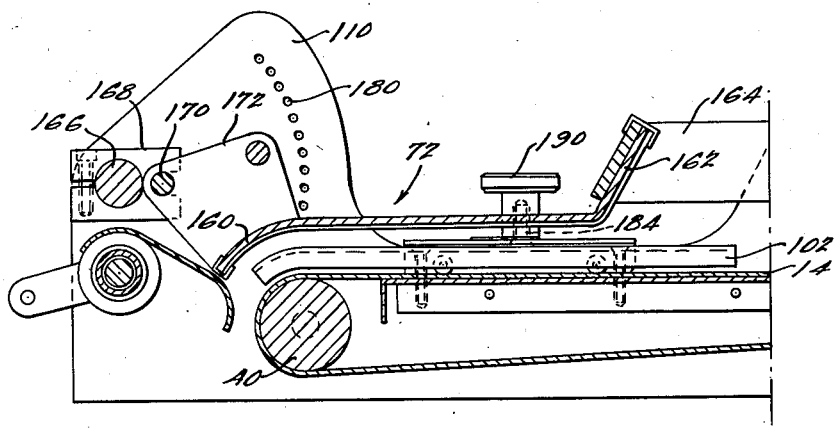
Fig. 4 is an enlarged, fragmentary, longitudinal, vertical sectional view taken on the line 4—4 of Fig. 2.

In the drawings, wherein for the purpose of illustration is shown a preferred embodiment of the invention, the numeral 10 designates a relatively large, generally box-shaped base which preferably is mounted on caster wheels 12 and supports the endless conveyer belt 14. As perhaps best shown in Fig. 1, the base 10 is adapted to be mounted with one end of the belt 14 disposed in front of a cross-grain molder illustrated diagrammatically at 16. The molder 16 is not part of the present invention, and it is sufficient to say that dough pieces made up in the molder are thrown successively from the side onto the belt 14 which then carries the dough pieces to an automatic panning device (not shown) at the opposite end 18 of the apparatus.

Flour is dusted continuously onto the belt 14 before it passes in front of the molder 16 to prevent the dough pieces from sticking to the belt. In the form of the invention here shown, flour is supplied automatically to the belt 14 from a sifter 20, and the operating arm 22 of the sifter is connected by a crank arm 24 to an eccentric 26 which in turn is rotatably driven by the motor 27. The drive shaft of motor 27 carries a sprocket 28 which drives a sprocket 29 by an endless chain 30. A sprocket 31 mounted to rotate with sprocket 29 drives a sprocket 32 on the input shaft of reduction gearing 33 through endless chain 34. Another sprocket (not shown) similar to sprocket 32 and also mounted on the input shaft of gearing 33 is connected to a sprocket 35 on the eccentric 26 by an endless chain 36. The output shaft of gearing 33 is connected to the head of molder 16 by an endless chain 37. A vertical plate 38 is mounted transversely across the belt 14 and in front of the sifter 20 to prevent fanning which results when the dough pieces are cast onto the belt from blowing flour off the belt.

The endless belt 14 is trained about rollers 39 and 40 adjacent opposite ends of the base 10, and it is a feature of the invention that two step-downs designated generally by the numerals 42 and 44 are provided in the upper run of the belt. The step-down 42 is formed by rollers 46 and 48, and the step-down 44 is formed by rollers 50 and 52.

Immediately to the left of the molder 16, as viewed in Fig. 1, and substantially in advance of the first step-down 42 is a conventional automatic coiler 54. The belt 14 moves in the direction of the arrow in Fig. 1, and substantially immediately after the dough pieces are deposited on the belt 14 they are carried through the coiler 54 which forms them into a generally roll shape. From the coiler 54 the dough pieces pass under a pressure board 56 which is located above the belt and in advance of the first step-down 42. A panel or strip 58 of chain mesh or the like hanging downwardly from the trailing edge of pressure board 56 drags across the dough pieces as they are moved out from under the pressure board by the belt 14 and positions any angularly disposed dough pieces substantially transversely on or at right angles to the length of the belt. Located between the pressure board 56 and the step-down 42 is means in the form of laterally spaced wheels 60 and 62 which are driven in a manner hereinafter described for centering misaligned dough pieces on the belt 14. After leaving the centering means the dough pieces drop over the step-down 42 which straightens the dough pieces, although it may leave them positioned angularly on the belt 14. After leaving the step-down 42 the dough pieces pass under a second pressure board 64 where they are further flattened and elongated. As the dough pieces move out from under pressure board 64 they are engaged by a second chain mesh panel 66 which positions them transversely on the belt 14. Thereafter, the dough pieces pass through a second centralizing means in the form of laterally spaced, rotatably driven wheels 68 and 70 which centralize any dough pieces not properly centered by the first pair of wheels 60 and 62. After leaving the wheels 68 and 70 the dough pieces drop over the step-down 44 and are moved by the belt 14 under a third pressure board 72 to the automatic panning device (not shown).

The belt 14 can be driven in any suitable or conventional manner. In the particular form of the invention here shown, however, the belt 14 is driven by the motor 27 and from a gear (not shown) similar to and coactive with the gear 28, through a chain 74 which engages a sprocket 76 on a shaft 78 rotatably carried by support 80. The shaft 78 also carries a gear 82 which meshes with a second gear 84 on a shaft 86 carried by the support 80. Shafts 78 and 86 also carry sprockets 88 and 90. Sprocket 88 is connected by chain 92 to a sprocket 96 on the roller 48, and the sprocket 90 is connected by chain 94 to sprockets 98 and 99 on the rollers 46 and 48 respectively. In this manner both rollers 48 and 50 are rotatably driven in the same direction and at the same speed. It is important that the belt 14 run slowly so as not to extend the dough pieces too rapidly. This latter contingency ruptures the cells of the dough and causes discoloration conventionally referred to in the art as "cores" in the center of the loaves. A speed of approximately 125 feet per minute has been found satisfactory.

The three pressure boards 56, 64 and 72 roll and elongate the dough pieces as they pass successively from one pressure board to the other, and the three pressure boards preferably add up to the length of a standard pressure board. The reason for using three pressure boards is that dough can be extended only so far without injury. If the dough is released and allowed to relax it can be extended much farther each time without injury to the cell structure. It is important that the first extension be slight in order to prevent the pressure being too abrupt, and the distance between belt 14 and pressure board 56 therefore preferably is only slightly less than the average height of the dough pieces as they come from the coiling mechanism 54.

As hereinafter pointed out in detail, each of the pressure boards 56, 64, and 72 is adjustable relative to the belt 14 to compensate for variation in the size of dough pieces produced by the molder 16. In the case of pressure board 56, however, the means for adjusting the board is constructed so that the board cannot be lowered sufficiently to harm the cell structure of the dough pieces. As suggested, the second pressure board 64 further extends the dough pieces and also controls the seam which is produced longitudinally in the dough pieces by the coiling mechanism 54. The board 64 preferably is adjustable as to length and in operation the board is adjusted so that the seams are on the bottom of the dough pieces as they leave the board. The last pressure board 72 extends the dough pieces a final amount.

As the dough pieces pass under the last pressure board 72 the ends thereof engage guide rails 100 and 102 to square up the ends of the loaves. In automatic equipment of the type here under consideration, guide rails such as the two rails 100 and 102 here shown are the only known means for producing square ends on the loaves. However, it also is generally known and understood in the art that side rails of the type shown cause bad cell structure at the ends of the loaf. Usually the defective cell structure extends inwardly about three or four slices from the ends of each loaf. It is a feature of this invention that the guide rails 100 and 102 can be used without adversely affecting the cell structure at the ends of the dough pieces. Apparently this is possible because a plurality of separate pressure boards are used instead of the single pressure board conventionally employed. When several individual and separate pressure boards are used, as here shown and described, the dough pieces are not subjected to severe punishment at any point in their travel on the belt 14. As a result, the dough is alive throughout at the time it reaches the guide rails 100 and 102, and no damage is done to the cells of the dough pieces even though the total effort of the pressure boards and the guide rails cause substantial deformation of the dough pieces. The guide rails are relatively short and preferably contact each dough piece only through approximately two revolutions.

The specific construction of the first pressure board 56 and the means for adjusting the same to and from the conveyor 14 is now described. As shown in Fig. 6, the board proper has a flat middle portion 101 which extends substantially the full width of the conveyor belt 14 and is disposed generally parallel to the belt. At the leading edge thereof the board 101 is formed with an upturned flange 103, and the flange is provided at opposite sides thereof with rearwardly extending arms 104 which are pivoted to vertical supports 106 disposed at opposite sides of the belt 14. In this connection it will be observed that the arms 104 are disposed substantially above the plane of the middle portion 101. This construction provides a step at the leading edge of the board 56 and positions the board some distance back from the mounting pivots. The board 56 is adjustable to and from the belt 14 about the mounting pivot, and the arms 104 provide a relatively long radius for the adjustment so as to permit raising and lowering of the board without appreciably varying the angular relation between the board and the conveyor belt 14. The trailing edge of the board 56 is similarly formed with an upwardly and rearwardly inclined flange portion 108 which releases the dough pieces gradually as they move from under the board. The flexible panel or strip 58 conveniently can be suspended from the trailing edge of the board as shown in the drawings; and the panel, by the physical act of dragging across the dough pieces, straightens them if they are positioned diagonally or angularly on the conveyor belt 14.

The mechanism for adjusting pressure board 56 is mounted on side frames 110 which extend along opposite sides of the base 10 from adjacent the trailing edge of pressure board 56 to the discharge end of the machine. Specifically, the adjusting means comprises a rockshaft 112 extending between the side frames 110 and carrying radial yoke members 114 which embrace a bar 116 fastened to the pressure board by mounting brackets 118. A handle 120 mounted on one end of the rockshaft 112 is positioned outside of the adjacent side frame member 110, and a handpiece 122 at the end of handle 120 has an inwardly projecting pin 124 (Fig. 2) which enters any one of a series of openings 126 disposed arcuately around rockshaft 112. Manifestly, as the shaft 112 is rocked back and forth about its axis the yokes 114 are swung angularly to raise or lower the pressure board 56, and the projection 124 can be engaged in any of the openings 122 to hold the pressure board in a selected adjusted position. Preferably, the various positions of the board 56 are numbered or otherwise designated as shown at 128 in Fig. 6 for convenience in setting the pressure board 56 in a desired position.

Figure 5:
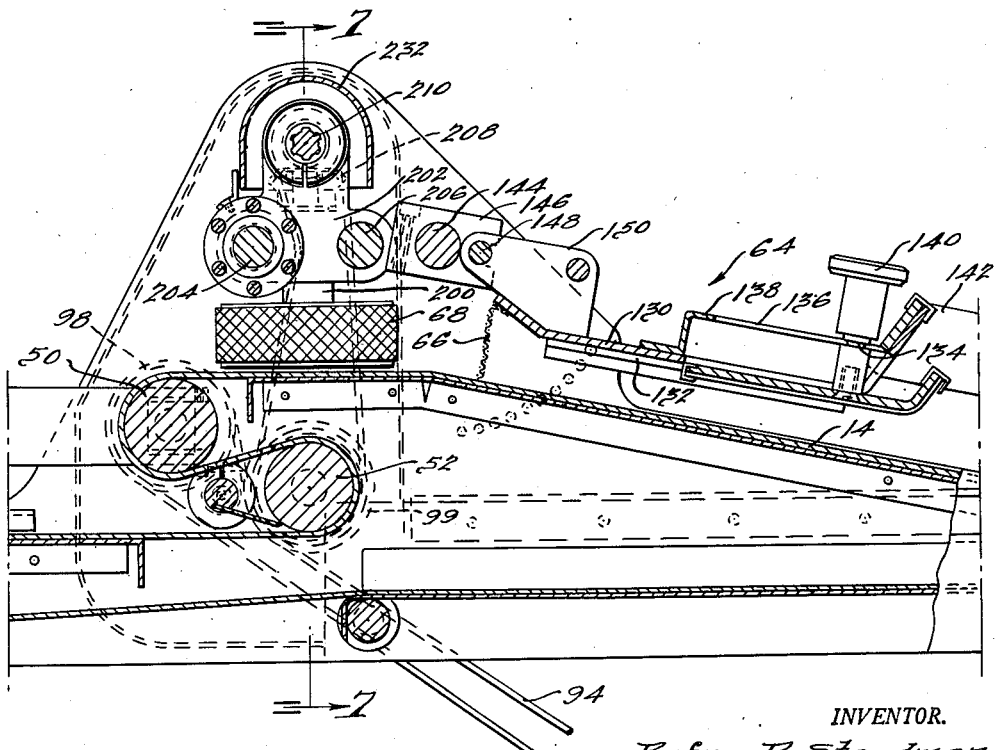
Fig. 5 is an enlarged, fragmentary, longitudinal, vertical sectional view taken on the line 5—5 of Fig. 2.

The second pressure board 64 is perhaps best illustrated in Fig. 5. It is generally similar to the first pressure board 56 but differs somewhat in details of construction. For example, pressure board 64 is formed from upper and lower sections 130 and 132 which telescope together and are adjustable to vary the length of the board longitudinally of conveyor 14. In order to hold the two sections 130 and 132 in a selected adjusted position, the bottom section 132 is formed with an upstanding threaded stud 134 which extends through an elongated slot 136 in a bracket 138 on the upper section 130, and a thumb nut 140 threaded on the stud 134 is tightened against the bracket 138 to hold the two sections stationary. It will be readily apparent in this connection, however, that when thumb nut 140 is loosened, the two sections 130 and 132 can be adjusted longitudinally within limits defined by the slot 136, and thus by tightening the thumb nut 140, the two sections can be held in selected adjusted position. As suggested above, pressure board 64 is adjustable as to length primarily in order to control the position of the seam formed in the dough pieces when they are formed into a roll shape by the coiling mechanism 54. Pressure board 64 is similarly provided with mounting arms 142, and the arms conveniently may be pivoted to the ends of the shaft which supports roller 46, as perhaps best shown in Fig. 2. The swinging panel 66 is similarly fastened to the trailing edge of board 64, and it acts on the dough pieces as they emerge from under the board to position the dough pieces transversely on the belt 14.

Pressure board 64 is adjusted relative to belt 14 in the same manner as pressure board 56. A rockshaft 144 journaled to and extending between side frames 110 carries yokes 146 which embrace a bar 148 on mounting brackets 150 secured to the upper section 130 of the board. A handle 152 fastened to the rockshaft 144 carries a handgrip 154 having an inwardly projecting pin 156 which cooperates with an arcuate series of openings 158 in the adjacent side frame 110 to hold the pressure board 64 in a selected adjusted position relative to the belt 14.

The third pressure board 72 is substantially identical to the second pressure board 56 except that the trailing edge 160 thereof curves downwardly in conformance with the end of conveyer 14, as shown in Fig. 4. The leading edge of the pressure board is turned angularly upwardly as at 162 and carries mounting arms 164 which conveniently are journaled to the shaft which carries roller 50 as shown in Fig. 2.

Pressure board 72 is adjusted relative to belt 14 in the same manner as the pressure boards hereinabove described. A rockshaft 166 journaled between side frames 110 carries yoke arms 168 which embrace a bar 170 on brackets 172 fastened to the pressure board 72. A handle 174 on the rockshaft 166 carries a handpiece 176 having an inwardly projecting pin 178 which engages in an arcuate series of holes 180 to hold the pressure board 72 in a selected adjusted position.

As shown in Fig. 2, the rails 100 and 102 are mounted on and carried by the pressure board 72. It is desirable to vary the distance between guide rails 100 and 102 from time to time, and to this end the rails are provided with outwardly extending slides 180 and 182 respectively. Studs 184 on the slides 180 and 182 extend upwardly through elongated slots 186 in stationary plates 188 which extend outwardly from the sides of the pressure board 72. Thumb nuts 190 on the studs 184 hold the rails 100 and 102 fastened securely to the plates 188 and in selected adjusted positions within limits defined by slots 186. Pointers 192 on the studs 184 co-operate with scales 194 on mounting plates 188 to indicate visually the adjusted positions of the guide rails 100 and 102.

Attention is now directed to Figs. 5 and 7 which show in detail the construction of the centering spinners or wheels 68 and 70. The spinners are carried by upwardly extending shafts 200 and the shafts are journaled for rotation in gear brackets 202 mounted on parallel horizontal shafts 204 and 206 carried by side frames 110. Fixed on the upper ends of shafts 200 and above the gear brackets 202 are bevel gears 208 which mesh with bevel gears 210 mounted for rotation on upward extensions 212 of the gear brackets 202 (Fig. 7). Bevel gears 210 are splined on a drive shaft 214 which extends between and is rotatably supported by side frames 110, as perhaps best shown in Fig. 7. A sprocket 216 on one end of drive shaft 214 is connected by an endless chain 218 to a sprocket 220 on the end of the shaft which carries roller 52. Thus, the spinning wheels 68 and 70 are rotatably driven from the roller which drives the endless belt 14. Specifically, the belt roller 52 drives shaft 214 through sprockets 216 and 220 and endless chain 218. Shaft 214 in turn rotatably drives the wheels 68 and 70 through bevel gears 208 and 210. It is significant in this respect that the wheels 68 and 70 are rotatably driven in opposite directions so that the inner peripheries thereof travel in the same direction as the belt 14, and the gear ratios which drive the wheels are such that the wheels are driven substantially faster than the belt.

As in the case of the guide rails 100 and 102 it is desirable that the wheels 68 and 70 be adjustable transversely across the belt 14. In the particular construction here shown by way of illustration the wheels are adjustable between the full- and broken-line positions in Fig. 7. To this end the shaft 204 is formed with oppositely threaded sections 222 and 224 which threadedly engage respective gear brackets 202 so that the brackets can be moved simultaneously either in or out by rotating the shaft 204 in one direction or the other. One end of the shaft 204 extends laterally of the base 10 and the protruding end of the shaft carries a handwheel 226 which is manually operable to rotate shaft. In this connection it should be noted that the splined portions of shaft 214 which engage gears 210 are sufficiently long so that the gears are free to slide on the shaft during adjustment of the wheels 68 and 70 without affecting the driving connection between the shaft and the gears. Pointers 228 on the gear brackets 202 co-operate with scales 230 on a guard 232 for the gearing which drives the wheels, to indicate visually the adjusted position of the wheels.

Spinner wheels 60 and 62 are mounted, rotatably driven, and adjustable in the same manner as spinner wheels 68 and 70.

In practice, the two spinner wheels in each pair are adjusted so that the distance between them is slightly greater than the length of the dough pieces handled by the conveyer. For example, if the dough pieces are twelve inches long after passing through the first pressure board 56, the wheels 60 and 62 are spaced apart approximately 12½ inches. If the dough pieces are centered properly on the belt 14, they do not engage but merely pass between the spinner wheels. However, if any dough piece is misaligned or off-center on the belt 14, it strikes one or the other of the spinner wheels. By reason of the fact that the wheels travel much faster than the conveyer and in the same direction as the conveyer, the wheel flips the engaged end of the dough piece inwardly toward the middle of the conveyer. Preferably, the peripheries of the wheels are knurled or otherwise roughened so that the wheels get a proper purchase on the dough pieces. I have found that the wheels operating in this manner are capable of handling and moving the essentially weak, soft material of the dough pieces without breaking or rupturing the outer skin thereof.

The above action is perhaps best illustrated in Fig. 8 which shows the manner in which the wheels operate to center or at least approximately center misaligned dough pieces on the conveyor 14. The dough piece shown at 230 is not properly centered on the conveyor 14 and will engage the wheel 62. When the dough piece engages wheel 62 the latter flips the engaged end of the dough piece onto the middle portion of the conveyor, as shown at 232. If the dough piece is left in this position, however, it will not fall properly into the baking pans at the end of the conveyor. Accordingly, means is provided for straightening the dough piece on the conveyor, and in the particular embodiment illustrated this means comprises the step-down 42. The forwardly thrust end of the dough piece goes over the step-down first as shown at 234. Since the lower end of the dough piece is forwardly of the main portion thereof, it drops over the step-down first and engages the lower run of the belt. As a result the opposite or upper end of the dough piece flops downwardly pivoting about the lower end, thereby moving the upper end of the dough piece to the position illustrated at 236. Thereafter the dough piece passes under the swinging panel 58 and as the latter drags across the dough piece it positions it transversely in a central position on the belt 14.

If by chance any dough piece is extended farther by the second pressure board 64 so that it again extends laterally beyond the central portion of the belt 14, the second set of spinner wheels 68 and 70, together with the step-down 44, operate exactly as described above to center it.

From the foregoing it will be readily apparent that one or the other of the first set of spinner wheels 60 and 62 engages the projecting end of any dough piece which is misaligned and positions it transversely on the belt and that step-down which follows the set of wheels then swings the other end of the dough piece to its correct position so that the entire dough piece is properly positioned centrally of the belt. In this manner the two features described co-operate and by their joint effort position the dough piece centrally on the belt without breaking the skin or in any way damaging the cell structure of the dough piece. Further, both of these features act jointly with the swinging panel to square or position the dough piece transversely on the conveyor. As a result, the dough pieces are delivered by the conveyor properly to the automatic panning device conventionally positioned at the discharge end of the conveyor even though they are not delivered uniformly to the belt 14 by the molder 16.

Having thus described the invention, I claim:

1. In an automatic dough-handling machine, an endless conveyor belt for moving dough pieces through the machine, at least one wheel mounted for rotation about a vertical axis above the conveyer belt at the margin thereof and rotatable so that the inner periphery thereof travels in the same direction as but faster than the belt, said wheel being engageable with dough pieces extending onto the mentioned marginal portion of the conveyer belt and operative to flip the engaged portions of such dough pieces toward the middle of the belt, and a step-down in the belt behind said wheel providing a drop-off over which the dough pieces fall and operative to substantially straighten the pieces while keeping them positioned substantially centrally on the belt.

2. In an automatic dough-handling machine, a conveyer belt for moving dough pieces through the machine, a pair of wheels mounted for rotation about vertical axes above and at opposite sides of the conveyer belt, said wheels being rotatable in opposite directions with the inner peripheries thereof moving in the same direction as but faster than the belt and engageable with misaligned dough pieces on the belt to flip the engaged portions of such pieces toward the middle of the belt, and a step-down in the belt behind said wheels providing a drop-off over which the dough pieces fall and operative to substantially straighten said pieces while keeping them positioned substantially centrally on the belt.

3. In an automatic dough-handling machine, a conveyer belt for moving dough pieces through the machine, a pair of wheels mounted for rotation about vertical axes above opposite marginal portions of the conveyer belt, means for rotatably driving the wheels in opposite directions with the inner peripheries thereof moving in the same direction as but faster than the belt, said wheels having knurled peripheral surfaces and the knurling being engageable with dough pieces extending onto the mentioned marginal portions of the belt and operative to flip the engaged portions of such dough pieces onto the belt between said marginal portions, and a step-down in the belt behind said wheels providing a drop-off over which the dough pieces fall and operative to substantially straighten the pieces while keeping them positioned substantially centrally on the belt.

4. In an automatic dough-handling machine, a conveyer belt for moving dough pieces through the machine, a pair of wheels mounted for rotation about vertical axes above opposite marginal portions of the belt, means for rotatably driving said wheels so that the inner peripheries thereof travel in the same direction as but faster than the belt, said wheels being engageable with misaligned dough pieces on the belt to flip the engaged ends of said pieces toward the middle of the belt, means for adjusting said wheels across the belt and relative to each other to regulate the width of the marginal portions controlled by the wheels, and a stepdown in the belt behind said wheels providing a drop-off over which the dough pieces fall and operative to substantially straighten the pieces while keeping them positioned substantially centrally on the belt.

5. In an automatic dough-handling machine, a conveyer belt for moving dough pieces through the machine, a pair of wheels mounted for rotation about vertical axes above opposite marginal portions of the belt, means for rotatably driving said wheels so that the inner peripheries thereof travel in the same direction as but faster than the belt, said wheels being engageable with misaligned dough pieces on the belt to flip the engaged ends of said pieces toward the middle of the belt, mechanism carrying said wheels and including an actuator shaft having oppositely threaded portions, said shaft being rotatably adjustable to move the wheels laterally across the conveyer belt to regulate the width of the marginal portions controlled by the wheel, and a step-down in the belt behind said wheels providing a drop-off over which the dough pieces fall and operative to substantially straighten the pieces while keeping them positioned substantially centrally on the belt.

6. In an automatic dough-handling machine, an endless conveyer belt for moving dough pieces through the machine, at least one rotatable member mounted for rotation about a vertical axis above the conveyer belt at the margin thereof and rotatable so that the inner periphery thereof travels in the same direction as but faster than the belt, said wheel engageable with dough pieces extending onto the mentioned marginal portion of the conveyer belt and operative to flip the engaged portions of such dough pieces toward the middle of the belt, a step-down in the belt behind said wheel providing a drop-off over which the dough pieces fall and operative to substantially straighten the pieces while keeping them positioned substantially centrally on the belt, and means forming an obstruction extending across the belt behind said step-down engageable with the dough pieces and operative to adjust any angularly disposed dough piece to a position substantially at right angles to the length of the belt.

7. In an automatic dough-handling machine, a conveyer belt for moving dough pieces through the machine, a pair of wheels mounted for rotation about vertical axes above and at opposite sides of the conveyer belt, said wheels being rotatable in opposite directions with the inner peripheries thereof moving in the same direction as but faster than the belt and engageable with misaligned dough pieces on the belt to flip the engaged ends of said pieces toward the middle of the belt, a step-down in the belt behind said wheels providing a drop-off over which the dough pieces fall and operative to substantially straighten the pieces while keeping them positioned substantially centrally on the belt, and a swinging panel extending across the belt behind said step-down engageable with the dough pieces and operative to adjust any angularly disposed dough piece to a position substantially at right angles to the length of the belt.

8. In an automatic dough-handling machine, a conveyer belt for moving dough pieces through the machine, a pair of wheels mounted for rotation about vertical axes above opposite marginal portions of the conveyer belt, means for rotatably driving the wheels in opposite directions with the inner peripheries thereof moving in the same direction as but faster than the belt, said wheels having knurled peripheral surfaces and the knurling being engageable with dough pieces extending onto the mentioned marginal portions of the belt and operative to flip the engaged portions of said dough pieces onto the belt between said marginal portions, a step-down in the belt behind said wheels providing a drop-off over which the dough pieces fall and operative to substantially straighten the pieces while keeping them positioned substantially centrally on the belt, and a swinging panel extending across the belt behind said step-down engageable with the dough pieces and operative to adjust any angularly disposed dough piece to a position substantially at right angles to the length of the belt.

9. In an automatic dough-handling machine, a conveyer belt for moving dough pieces through the machine, a pair of wheels mounted for rotation about vertical axes above opposite marginal portions of the belt, means for rotatably driving said wheels so that the inner peripheries thereof travel in the same direction as but faster than the belt, said wheels being engageable with misaligned dough pieces on the belt to flip the engaged ends of said pieces toward the middle of the belt, means for adjusting the wheels across the belt and relative to each other to regulate the width of the marginal portions controlled by the wheels, a step-down in the belt behind said wheels providing a drop-off over which the dough pieces fall and operative to substantially straighten the pieces while keeping them positioned centrally on the belt, and a swinging panel extending across the belt behind said step-down engageable with the dough pieces and operative to adjust any angularly disposed dough piece to a position substantially at right angles to the length of the belt.

10. In an automatic dough-handling machine, a conveyer belt for moving dough pieces through the machine, a pair of wheels mounted for rotation about vertical axes above opposite marginal portions of the belt, means for rotatably driving said wheels so that the inner peripheries thereof travel in the same direction as but faster than the belt, said wheels being engageable with misaligned dough pieces on the belt to flip the engaged ends of said pieces toward the middle of the belt, mechanism carrying said wheels and including an actuator shaft having oppositely threaded portions and rotatably adjustable to move the wheels laterally across the conveyer belt to regulate the width of the marginal portions controlled by the wheels, a step-down in the belt behind said wheels providing a drop-off over which the dough pieces fall and operative to substantially straighten the pieces while keeping them positioned substantially centrally on the belt, and a swinging panel extending across the belt behind said step-down engageable with the dough pieces and operative to adjust any angularly disposed dough piece to a position substantially at right angles to the length of the belt.

11. In an automatic dough-handling machine, a conveyer belt for moving dough pieces through the machine, a pair of wheels mounted for rotation about vertical axes above and at opposite sides of the conveyer belt, said wheels being rotatable in opposite directions with the inner peripheries thereof moving in the same direction as but faster than the belt and engageable with misaligned dough pieces on the belt to flip the engaged portions of said pieces toward the middle of the belt, a step-down in the belt behind said wheels providing a drop-off over which the dough pieces fall and operative to substantially straighten the pieces while keeping them positioned substantially centrally on the belt, and a strip of chain net extending across and dragging on the belt behind said step-down engageable with the dough pieces and operative to adjust any angularly disposed dough piece to a position substantially at right angles to the length of the belt.

12. In an automatic dough-handling machine, a conveyer belt for moving dough pieces through the machine, means for adjusting misaligned dough pieces on the belt to a substantially central position on the belt, a step-down in the belt behind said adjusting means providing a drop-off over which the dough pieces fall and operative to substantially straighten the pieces while keeping them positioned substantially centrally on the belt, and means forming an obstruction extending across the belt behind said step-down engageable with the dough pieces and operative to adjust any angularly disposed dough piece to a position substantially at right angles to the length of the belt.

13. In an automatic dough-handling machine, a conveyer belt for moving dough pieces through the machine, means for adjusting misaligned dough pieces on the belt to a substantially central position on the belt, a step-down in the belt behind said adjusting means providing a drop-off over which the dough pieces fall and operative to substantially straighten the pieces while keeping them positioned centrally on the belt, and a swinging panel extending across the belt behind said step-down engageable with the dough pieces and operative to adjust any angularly disposed dough piece to a position substantially at right angles to the length of the belt.

14. In an automatic dough-handling machine, a conveyer belt for moving dough pieces through the machine, means for adjusting misaligned dough pieces on the belt to a position substantially centrally of the belt, a step-down in the belt behind said adjusting means providing a drop-off over which the dough pieces fall and operative to substantially straighten the pieces while keeping them positioned substantially centrally on the belt, a pressure board mounted above the belt behind said step-down, and a relatively heavy but flexible chain-net strip carried by the pressure board and dragging on the belt, said strip engageable with dough pieces as they are moved under the strip by the belt and operative to adjust any angularly disposed dough pieces to a position substantially at right angles to the length of the belt.

15. In an automatic dough-handling machine, a conveyer belt for moving dough pieces through the machine, means for adjusting misaligned dough pieces on the belt to a position substantially centrally of the belt, a step-down in the belt behind said adjusting means providing a drop-off over which the dough pieces fall and operative to substantially straighten the pieces while keeping them positioned substantially centrally on the belt, a pressure board mounted above the belt behind said step-down, a chain-net panel carried by the pressure board and dragging on the belt, said panel engageable with dough pieces as they are moved beyond the board by the belt and operative to adjust any angularly disposed dough pieces to a position substantially at right angles to the length of the belt, and a support for said pressure board having adjustable means permitting adjustment of the board and of the chain net carried thereby relative to the conveyer belt.

16. In an automatic dough-handling machine, a conveyer belt for moving dough pieces through the machine, means for adjusting misaligned dough pieces on the belt to a position substantially centrally of the belt, a step-down in the belt behind said adjusting means providing a drop-off over which the dough pieces fall and operative to substantially straighten the pieces while keeping them positioned substantially centrally on the belt, a pressure board mounted above the belt behind said step-down, a chain-net panel carried by the pressure board and dragging on the belt, said panel engageable with dough pieces as they are moved beyond the board by the belt and operative to adjust any angularly disposed dough pieces to a position substantially at right angles to the length of the belt, a pivotal mounting for said pressure board permitting adjustment of the latter and of the chain net carried thereby relative to the conveyor belt, and adjustable means coactive with said pivotal mounting for positioning said pressure board and for holding the same in a selected adjusted position.

17. In an automatic dough-handling machine, a conveyer belt for moving dough pieces through the machine, means for adjusting misaligned dough pieces on the belt to a position substantially centrally of the belt, a step-down in the belt behind said adjusting means providing a drop-off over which the dough pieces fall and operative to substantially straighten the pieces while keeping them positioned substantially centrally on the belt, a pressure board mounted above the belt behind said step-down, a chain-net panel carried by the pressure board and dragging on the belt, said panel engageable with dough pieces as they are moved beyond the board by the belt and operative to adjust any angularly disposed dough pieces to a position substantially at right angles to the belt, pivot means supporting said pressure board and located adjacent to one end thereof, a transverse bar carried by the pressure board laterally of the pivot, a transverse rockshaft having a yoke arm receiving said bar, an upstanding stationary member adjacent to one end of the rockshaft having a series of openings disposed in arcuate relation around the axis of the shaft, and a handle on the mentioned end of the shaft having means engageable with said openings to hold the rockshaft in a selected, angularly adjusted position.

18. In an automatic dough-handling machine, a conveyer belt for moving dough pieces through the machine, a pair of wheels mounted for rotation about vertical axes above opposite marginal portions of the belt, means for rotatably driving said wheels so that the inner peripheries thereof travel in the same direction as but faster than the belt, said wheels being engageable with misaligned dough pieces on the belt to flip the engaged ends of said pieces toward the middle of the belt, means for adjusting the wheels across the belt and relative to each other to regulate the width of the marginal portions controlled by the wheels, a step-down in the belt behind said wheels providing a drop-over over which the dough pieces fall and operative to substantially straighten the pieces while keeping them centrally positioned on the belt, and a series of pressure boards disposed above and spaced longitudinally relative to each other along the length of the conveyer, said pressure boards successively engageable with the dough pieces as they are carried along by the conveyer and operative to extend such dough pieces by successive applications of pressure thereto, and means for adjusting said pressure boards to and from the surface of the conveyer.

19. In an automatic dough-handling machine, a conveyer belt for moving dough pieces through the machine, a pair of wheels mounted for rotation about vertical axes above and at opposite sides of the conveyer belt, said wheels being rotatable in opposite directions with the inner peripheries thereof moving in the same direction as but faster than the belt and engageable with misaligned dough pieces on the belt to flip engaged ends of said pieces toward the middle of the belt, at least two step-downs in the belt behind said wheels spaced longitudinally along the conveyer belt and with respect to each other, said step-downs providing drop-offs over which the dough pieces fall and operative to substantially straighten the dough pieces while keeping them positioned substantially centrally on the belt, and pressure boards mounted above the belt ahead of respective step-downs, said boards being engageable with dough pieces as they are moved thereunder by the belt and operative to adjust any angularly disposed dough pieces to a position substantially at right angles to the length of the belt, said pressure boards mutually operative to roll and progressively extend the dough pieces as they move along the conveyer.

20. In an automatic dough-handling machine, a conveyer belt for moving dough pieces through the machine, a pair of wheels mounted for rotation about vertical axes above and at opposite sides of the conveyer belt, said wheels being rotatable in opposite directions with the inner peripheries thereof moving in the same direction as but faster than the belt and engageable with misaligned dough pieces on the belt to flip engaged ends of said pieces toward the middle of the belt, at least two step-downs in the belt behind said wheels spaced longitudinally along the conveyer belt and with respect to each other, said step-downs providing drop-offs over which the dough pieces fall and operative to substantially straighten the dough pieces while keeping them positioned substantially centrally on the belt, and pressure boards mounted above the belt behind said step-downs, said pressure boards operative to engage the dough pieces after they have been straightened by said step-downs and as the dough pieces move away from the step-downs, engagement of the pressure boards with the dough pieces causing the latter to roll as they pass under the pressure boards and said pressure boards mutually co-operating to progressively extend the dough pieces.

RUFUS P. STEADMAN.

References Cited in the file of this patent

UNITED STATES PATENTS

| Number | Name | Date |
|---|---|---|
| 883,370 | Wood | Mar. 31, 1908 |
| 1,126,606 | Wolf | Jan. 26, 1915 |
| 1,843,381 | Hoodless | Feb. 2, 1932 |
| 1,988,047 | Peters | Jan. 15, 1935 |
| 2,323,537 | Harber | July 6, 1943 |
| 2,450,033 | Cohen | Sept. 28, 1948 |
| 2,471,112 | Maull et al. | May 24, 1949 |
| 2,590,823 | Rhodes | Mar. 25, 1952 |